(12) United States Patent
Carene et al.

(10) Patent No.: US 8,661,625 B2
(45) Date of Patent: Mar. 4, 2014

(54) SLIDABLE SEATBELT BUCKLE WITH INTEGRAL RIBBED COVER

(75) Inventors: Jim Carene, Whitmore Lake, MI (US); Robert Andrew Mical, Dearborn Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 80 days.

(21) Appl. No.: 13/073,001

(22) Filed: Mar. 28, 2011

(65) Prior Publication Data
US 2012/0246894 A1 Oct. 4, 2012

(51) Int. Cl.
*B60R 22/00* (2006.01)
*A44B 11/00* (2006.01)

(52) U.S. Cl.
USPC .................................. 24/200; 24/182; 24/197

(58) Field of Classification Search
USPC .............. 24/604, 182, 193, 197, 200; 16/430
See application file for complete search history.

(56) References Cited

U.S. PATENT DOCUMENTS

| 4,903,377 | A | * | 2/1990 | Doty ............................... 24/194 |
| 5,308,148 | A | * | 5/1994 | Peterson et al. ............... 297/468 |
| 6,837,519 | B2 | * | 1/2005 | Moskalik et al. .......... 280/801.1 |
| 2002/0108213 | A1 | * | 8/2002 | Stegmaier ....................... 16/430 |
| 2007/0039144 | A1 | * | 2/2007 | Ichida et al. .................... 24/633 |
| 2009/0295138 | A1 | * | 12/2009 | Cox et al. ................... 280/801.1 |
| 2011/0061204 | A1 | * | 3/2011 | Schulz .............................. 16/430 |

* cited by examiner

*Primary Examiner* — Robert J Sandy
*Assistant Examiner* — Michael Lee
(74) *Attorney, Agent, or Firm* — Jerome R. Drouillard; Frank MacKenzie

(57) ABSTRACT

A slidable buckle for a seatbelt includes a cover which has a number of ribs extending from the cover. The ribs function to limit noise caused by the buckle and webbing coming in contact with a vehicle's interior trim, while at the same time providing a softer, grippable surface for the buckle.

3 Claims, 3 Drawing Sheets

SLIDABLE SEATBELT BUCKLE WITH INTEGRAL RIBBED COVER

TECHNICAL FIELD

The present invention relates to a seatbelt buckle, and more particularly to a slidable seatbelt buckle for use in an automotive vehicle.

BACKGROUND

The slidable buckle portion of automotive seatbelts is typically suspended from the seatbelt's webbing so that the webbing and slidable buckle hang alongside an interior trim panel, such as a C-pillar trim panel when the seatbelt is not in use. If a vehicle is operated either with the windows open and at a higher speed, or on an uneven road, the suspended belt may swing on its upper mount, causing the slidable buckle to strike the interior trim with an annoying sound.

It would be desirable to provide a slidable buckle having both superior sound damping characteristics and a user-friendly soft-touch cover.

SUMMARY

According to an aspect of the present invention, a slidable buckle for a seatbelt includes a base having a webbing slot, with an engagement tang extending from the base. A cover encloses the base, with the cover including a number of ribs extending from the cover's surfaces.

According to another aspect of the invention, the cover preferably includes a relatively stiffer plastic applied to the entirety of the buckle's base, with the ribs being formed from a relatively more compliant plastic applied to a portion of the relatively stiffer plastic. Alternatively, the relatively more compliant plastic may be bonded, as by molding, to a portion of the buckle's base which is not covered by the relatively stiffer plastic.

According to another aspect of the invention, the base may include not only a tang have a latch engagement aperture, but also a number of apertures permitting the buckle's plastic cover to be molded through the base structure, locking the cover to the base.

It is an advantage of the present seatbelt buckle that undesirable noise which would otherwise be caused by the buckle striking a vehicle's interior surfaces will be greatly reduced, if not eliminated.

It is another advantage of the present seatbelt buckle that the gently compliant ribbing incorporated in the softer material of the buckle's cover, particularly at laterally opposed end portions of the buckle base, provides an improved tactile effect for the user of the belt, as compared with smooth, or lightly textured buckles.

Other advantages, as well as features of the present invention, will become apparent to the reader of this specification.

DESCRIPTION OF INVENTION

Figure 1:
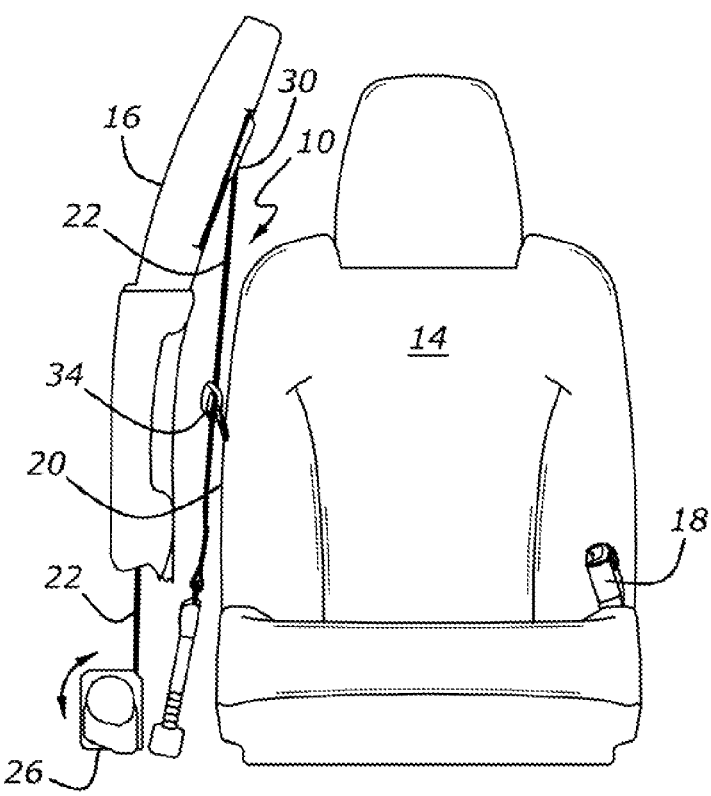
FIG. 1 is a partially schematic representation of a seatbelt system having a slidable buckle according to the present invention.

As shown in FIG. 1, automotive seat 14 has a seatbelt assembly, 10, which cooperates with fixed buckle 18 to restrain a vehicle occupant. Seatbelt assembly 10 includes an anchor, 30, which is fixed to a C-pillar, 16. Webbing 22, which is suspended from anchor 30, has a lower end attached to retractor 26. Slidable buckle 34 is suspended upon webbing 22.

Whenever seatbelt assembly 10 is not buckled, it is possible for slidable buckle 34 to impact upon either C-pillar 16, or the side of seatback 20. However, with the present invention, the noise which would otherwise be produced will be mitigated.

Figure 2:
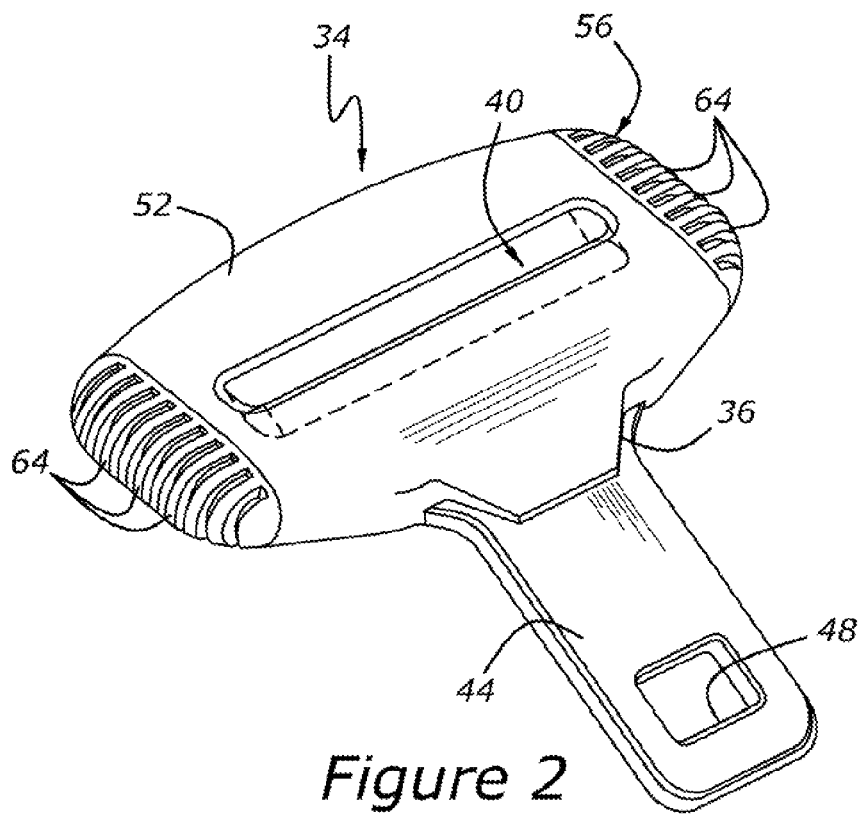
FIG. 2 is a perspective view of one embodiment of a seatbelt buckle according to the present invention.
Figure 3:
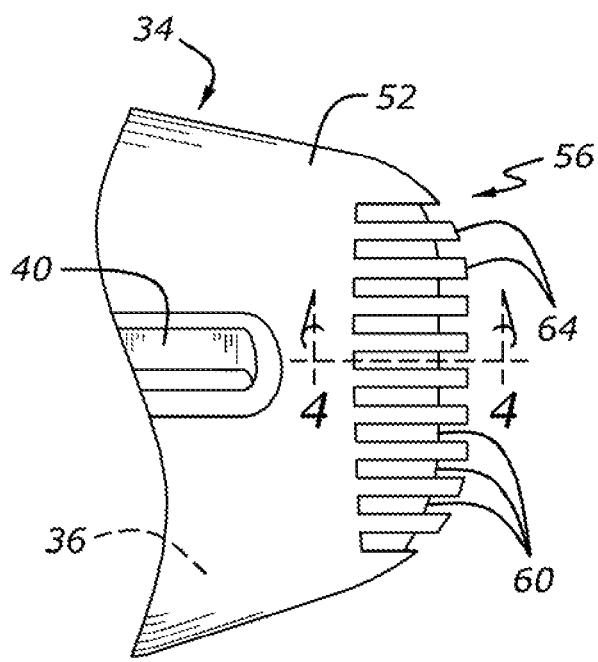
FIG. 3 is a plan view of a portion of the present seatbelt buckle, showing a ribbed portion, 64, with particularity.
Figure 4:
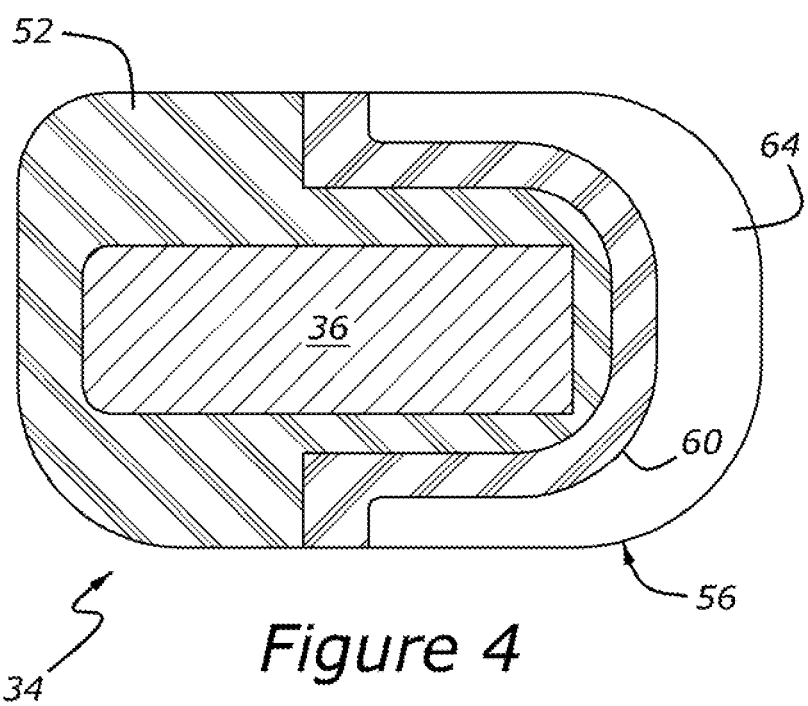
FIG. 4 is a sectional view of the buckle of FIG. 3, taken along the line 4-4 of FIG. 3.

FIGS. 2, 3, and 4 show a first embodiment according to the present invention. Slidable buckle 34 has a base, 36, which is one-piece with a tang, 44, having a latch engagement aperture, 48. A webbing slot, 40, extends through base 36. Base 36 is preferably constructed from a rigid, high-strength material such as steel. Buckle 34 also includes a cover. The center part of the cover includes a relatively stiffer molded plastic, 52, which serves to protect webbing 22 from wear caused by passage through slot 40. In effect, molded plastic 52 and base 36 define a coincident webbing slot. Plastic 52 may be selected from a number of different plastic materials such as polypropylene and yet other materials known to those skilled in the art and suggested by this disclosure.

In the embodiment of FIGS. 2, 3, and 4, relatively stiffer molded plastic 52 is applied to the entirely of base 36. However, a relatively more compliant plastic, 56, is molded over stiffer plastic 52 at laterally opposed end portions of base 36. As seen in FIGS. 3 and 4, overmolded plastic 56 is configured as a root section, 60, supporting a number of ribs, 64. The length and thickness of ribs 64 is selected to provide the desired sound damping, as well as tactile improvement, principally through greater compliance when gripped by a motorist. Plastic 56 may be chosen from a variety of plastics such as thermoplastic elastomers (TPE), silicones, and other compounds known to those skilled in the art and suggested by this disclosure.

Figure 5:
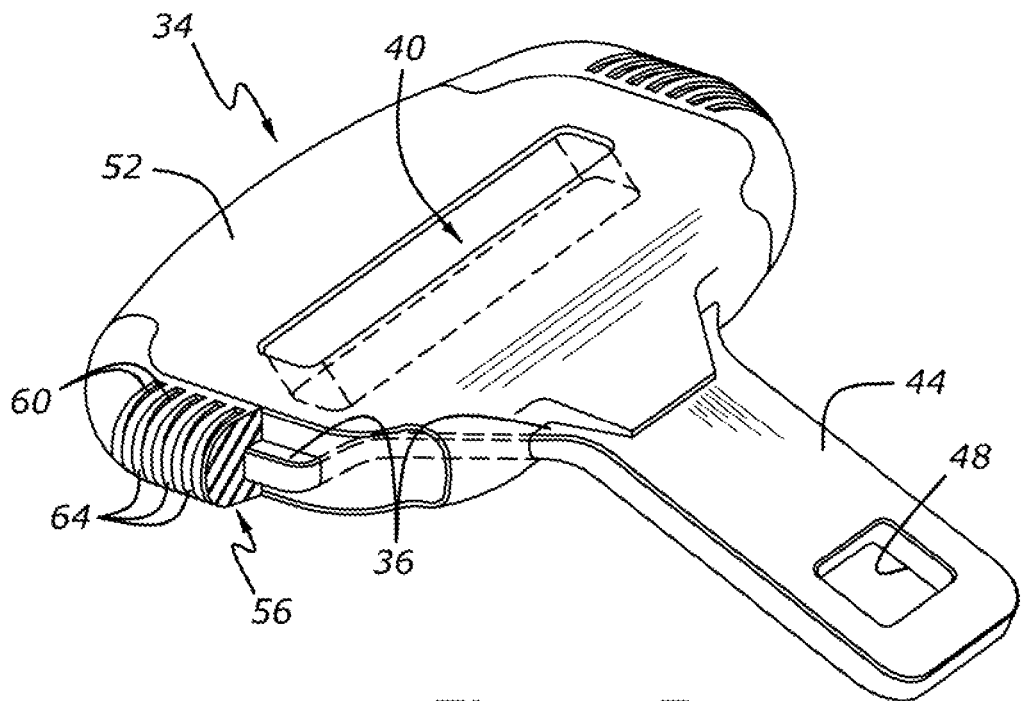
FIG. 5 is a perspective view, partially cut away, of a second embodiment of a seatbelt buckle according to the present invention.

FIG. 5 depicts an embodiment in which a portion of root section 60 is molded directly to base 36. In this manner, a more generous amount of plastic 56, having more extensive ribs, 64 may be provided without increasing the overall dimensions of buckle 34.

Figure 6:
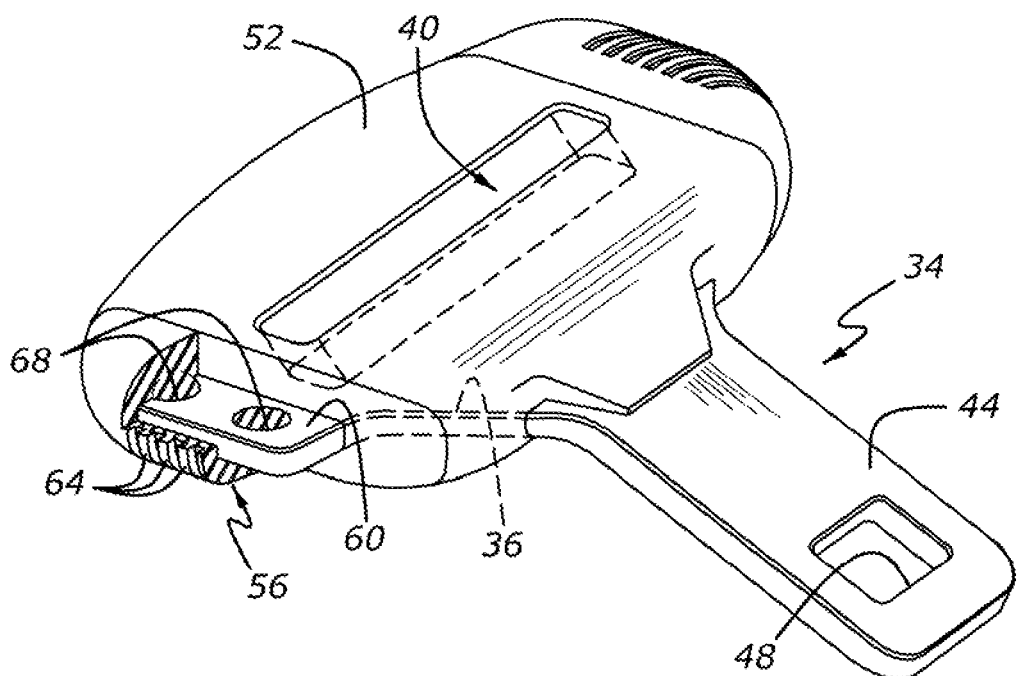
FIG. 6 is a perspective view, partially cut away, of another embodiment of a seatbelt buckle according to the present invention.

FIG. 6 shows an embodiment, which although similar to that of FIG. 5, has a number of retention apertures, 68, formed in base 36 at a location displaced from a central axis extending the length of base 36 from latch engagement aperture 48 to the center of webbing slot 40. When root section 60 and ribs 64 are molded to base 36, a portion of relatively more compliant plastic 56 will flow through each of apertures 68, thereby forming locking pins for securing the softer molded material to base 36.

While the best mode for carrying out the invention has been described in detail, those familiar with the art to which this invention relates will recognize various alternative designs and embodiments for practicing the invention as defined by the following claims.

The invention claimed is:

1. A slidable buckle for a seatbelt, comprising:
a metallic base having a webbing slot and a plurality of surfaces;
an engagement tang extending from said base; and
a cover generally enclosing said base, with said cover comprising:
a relatively stiffer plastic bonded directly to a first portion of said base and including a webbing slot coincident with the webbing slot of said base; and
a plurality of ribs extending from a plurality of surfaces of said base, with said plurality of ribs comprising a relatively more compliant plastic bonded directly to a second portion of said base, wherein said plurality of ribs comprises a root section extending through at least one aperture formed in said base, with said plurality of ribs further comprising grippable rib elements cantilevered from said root section.

2. The slidable buckle according to claim 1, wherein said plurality of ribs extend from laterally opposed end surfaces of said base.

3. The slidable buckle according to claim 1, wherein the relatively more compliant plastic is molded over an expanded portion of the base and through at least one aperture finned in said base at a location displaced from the center axis of the base.

* * * * *